United States Patent [19]

Yasuike et al.

[11] 4,106,887
[45] Aug. 15, 1978

[54] APPARATUS FOR INJECTION MOLDING SYNTHETIC RESIN MATERIALS

[75] Inventors: Akio Yasuike, Yokohama; Hiroshi Kataoka, Tokyo; Tutomu Fujikawa, Yamato; Naoto Suzuki, Kawasaki, all of Japan

[73] Assignee: Asahi-Dow Limited, Tokyo, Japan

[21] Appl. No.: 786,939

[22] Filed: Apr. 12, 1977

[30] Foreign Application Priority Data

Feb. 21, 1977 [JP] Japan ................. 52-17137

[51] Int. Cl.² ................. B29F 1/08; B29F 1/03
[52] U.S. Cl. ................. 425/549; 425/4 R; 425/535; 425/566; 425/567
[58] Field of Search ............... 425/564, 546, 4 R, 567, 425/130, 573, 568, DIG. 224, 133.1, 569, 562, 563, 566, 522, 535, 572, 565, 569, 549, 256

[56] References Cited

U.S. PATENT DOCUMENTS

| 2,940,123 | 6/1960 | Beck et al. ................. 425/546 X |
| 3,078,507 | 2/1963 | Park ................. 425/535 X |
| 3,127,458 | 3/1964 | Scott, Jr. et al. ................. 425/535 X |
| 3,813,014 | 5/1974 | Guerin ................. 425/569 X |
| 3,894,823 | 7/1975 | Hanning ................. 425/130 |
| 3,926,219 | 12/1975 | Ersfeld ................. 425/4 R |
| 3,947,177 | 3/1976 | Eckardt ................. 425/567 X |

FOREIGN PATENT DOCUMENTS

| 1,170,301 | 1/1959 | France ................. 425/522 |
| 1,929,343 | 12/1970 | Fed. Rep. of Germany ......... 425/4 R |

Primary Examiner—Francis S. Husar
Assistant Examiner—William R. Briggs
Attorney, Agent, or Firm—Cushman, Darby & Cushman

[57] ABSTRACT

An apparatus for injection molding synthetic resin materials comprises means for injecting the material to be molded, mold means having a cavity for receiving the material from said injecting means, entrance passage means connecting said injecting means with the cavity of said mold means and valve means disposed in said entrance passage means for closing it to shut off the flow of material in said entrance passage means, said valve means having a fluid passage communicating at its one end with only the cavity of said mold means when said valve means is closed, said fluid passage having the opposite end thereof adapted to connect with another source of pressurized fluid.

6 Claims, 10 Drawing Figures

APPARATUS FOR INJECTION MOLDING SYNTHETIC RESIN MATERIALS

The present invention relates to an apparatus for injection molding synthetic resin materials, and more particularly an injection molding device for use in producing hollowed articles or foamed articles with smoothened skin structure from such materials.

Such articles are produced by injecting molten synthetic resin into a mold cavity and thereafter charging a body of fluid thereinto to form a hollow portion in the injected resin material. The fluid used may be gas, liquid or low molecular weight polymer, for example. As required, high molecular weight polymer may be used as a fluid. It is preferred that the gas is gaseous nitrogen. The liquid is preferably water which is heated and pressurized. For the hollowed articles, the fluid is maintained within the mold cavity until the synthetic resin material sets therein. Thereafter, the fluid will be released from the mold cavity to remain the hollow portion in the body of material. For the foamed articles having smoothened skin layers, the fluid is released from the mold cavity when the injected material containing foaming agent does not sufficiently set in the mold cavity. Consequently, the injected material will expand inward to the hollow portion thereof which has been formed by fluid. These methods are in more detail disclosed in DT-OS 2,461,580.

In any case, it is required to control inlet passage to the mold cavity so that the fluid will be positively charged in the mold cavity or the foamable material will not be expanded within the injecting cylinder prior to injection. Structures, which are at present considered as being most suitable to control the inlet passage to the mold cavity, are disclosed, for example, in U.S. Pat. No. 3,947,175 issued to Robert Albert Melcher on Mar. 30, 1976; U.S. Pat. No. 3,947,177 issued to Helmut Eckardt on Mar. 30, 1976; and U.S. Pat. No. 3,972,664 issued to Werner Fillmann, for example. The structures each include an injection head having a central passage connected to two auxiliary passages which are connected to separate extruders, respectively. The central passage is controlled by means of a movable sleeve member and a needle member mounted slidably within the sleeve member. These controlling members are actuated by the respective actuators. However, such structures have disadvantages in that more complicated mechanisms are required with larger area of installation thereof.

Moreover, a multiple mold requires runner means connecting the gate of each cavity with the sprue thereof. The runner means is required also for a mold having a single cavity with a plurality of gates formed therein. The synthetic resin material which is injected to the mold cavity or cavities through the sprue tends to mingle with the fluid in the runner means. In order to prevent this problem, it is preferred that the fluid is charged directly into the mold cavity or cavities.

It is main object of the present invention to provide an apparatus for injection molding synthetic resin materials which can effectively charge any fluid into the mold means.

Another object of the present invention is to provide an injection molding device including valve means which can be actuated by simple actuator means to effectively open and close entrance means leading to the mold cavity, said valve means having fluid passage means for charging any fluid into the mold cavity.

Still another object of the present invention is to provide an injection molding device which can charge the fluid directly to the cavity or cavities of the mold means.

Other objects and advantages of the present invention will now be apparent from the following description with reference to the accompanying drawings in which:

Figure 1:
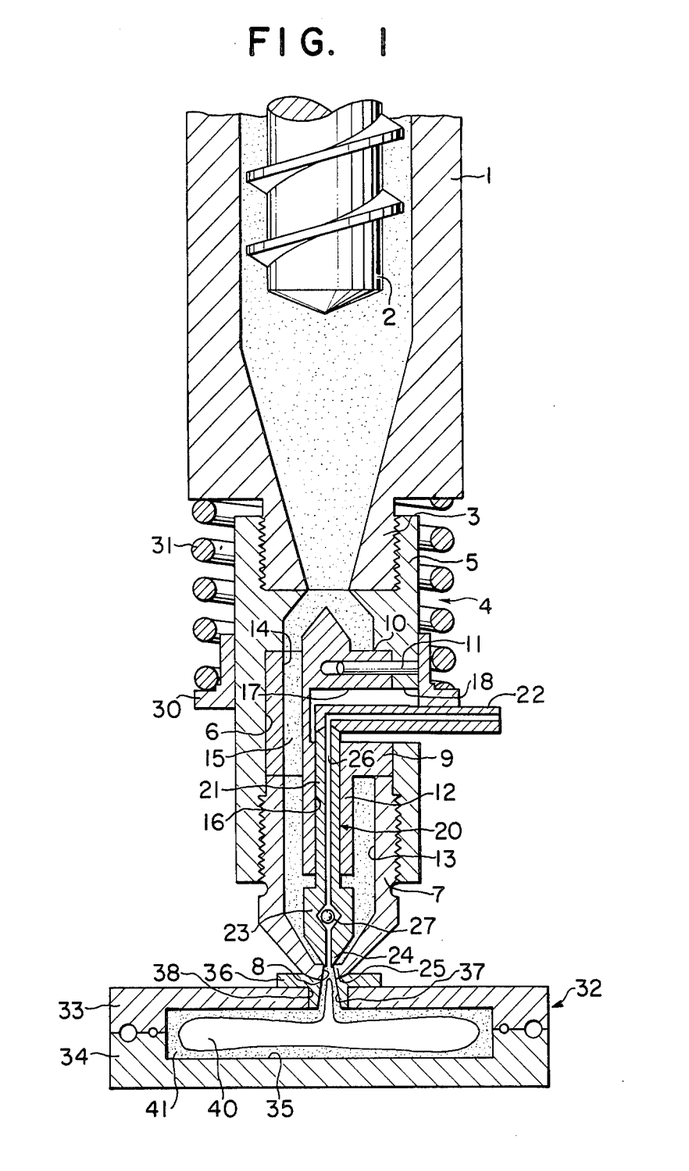
FIG. 1 is a longitudinally sectional view showing an injection molding device according to the present invention, which includes an injecting cylinder provided with valve means therewithin and a mold assembly.

Referring to FIG. 1, an injection molding device in accordance with the present invention comprises an injecting cylinder 1 within which a screw 2 is mounted to pressurize synthetic resin material supplied therein by any suitable means, not shown, in any well-known manner. The injecting cylinder 1 has its forward end formed with a threaded reduction 3 over which a nozzle device 4 is screwed.

The nozzle device 4 comprises a cylindrical base body 5 formed with its central bore 6 therethrough and a nozzle member 7 screwed into the forward threaded portion of the central bore 6. The opposite end of the nozzle member 7 is of substantially conical shape, the apex of which has a discharging aperture 8. The nozzle member 7 has its inner end face engaging with a supporting member 9 which is engaged also by a shoulder 10 formed on the central bore 6 so that the supporting member 9 will be firmly positioned within the central bore 6. The supporting member 9 may be secured against movement by means of a pin 11. The supporting member 9 includes a cylindrical portion 12 extending axially up to the middle of the bore 13 in the nozzle member 7 and spaced away from the inner periphery 14 of the supporting member 9. The inner periphery 14 is aligned with the bore 13 of the nozzle member 7 to form a cylindrical passage which is occupied by said cylindrical portion 12 to define a substantially annular passageway 15. This passageway 15 communicates with the interior of the injecting cylinder 1 so that the molten material can be fed from the injecting cylinder 1 through the annular passageway 15 to the discharge aperture 8 of the nozzle member 7.

The supporting member 9 has an axial bore 16 formed in the cylindrical portion 12 and a transverse aperture 17 connected to the axial bore 16 and aligned with the side opening 18 on the base body 5. The supporting member 9 supports a needle valve 20 which has an axial portion 21 slidably mounted within the axial bore 16 in a sealing manner and a transverse portion 22 extending from the rearward end of the axial portion 21 at right angle through the aperture 17 and opening 18 outside the base body 5. The transverse portion 22 has actually a transverse extension in the opposite direction, which is omitted in FIG. 1 for a simplicity of illustration. The transverse aperture 17 as well as the side opening 18 have such dimension as sufficiently to permit the transverse portion 22 to move up and down so that the axial portion 21 can slide axially in the axial bore 16 on the cylindrical portion 12 of the supporting member 9.

The needle valve 20 has its forward end formed with an enlarged head 23 having a conical tip portion 24. The tip portion 24 can be engaged by a valve seat 25 formed on the inner end of the discharging aperture 8 on the nozzle body 7 so as to close it in a manner as described hereinafter.

Figure 2:
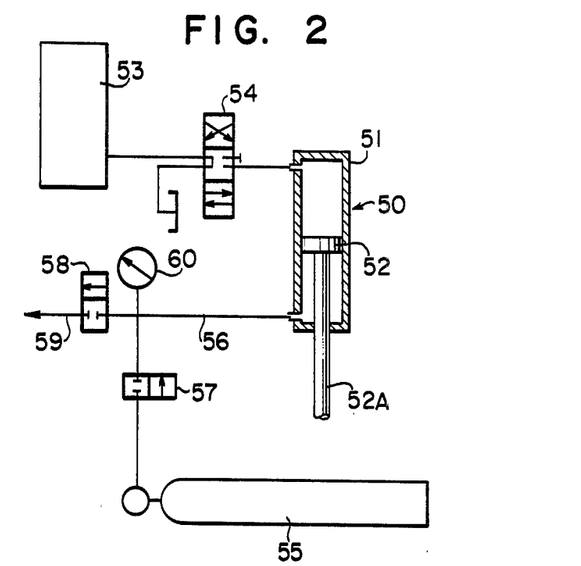
FIG. 2 is a schematic view showing a pressurizing mechanism connected to the valve means within the injecting cylinder as shown in FIG. 1.

The needle valve 20 has also a fluid passage 26 formed through the head 23, the axial portion 21 and the transverse portion 22. The fluid passage 26 has its one end opening at the apex of the conical tip portion 24 on the head 23 so that the fluid passage will be communicated with the discharging aperture 8 on the nozzle body 7 even when the head 23 is engaged by the valve seat 25 to close the discharging aperture 8. The opposite end of the fluid passage 26 is opened at the outside end of the transverse portion 22 in the needle valve 20. At this opposite end, the fluid passage 26 is connected to any suitable source of pressurized fluid such as shown in FIG. 2. Moreover, it is preferred that the fluid passage 26 has a check valve as at 27 in order to prevent the injected material from reversing.

The outside ends of the transverse portion 22 and said transverse extension on the needle valve 20 are engaged by a washer member 30 mounted slidably on the cylindrical base body 5. A compression spring 31 is located between the washer member 30 and the forward face of the injecting cylinder 1 so that the needle valve 20 will be urged axially in a direction that it closes the discharging aperture 8 of the nozzle body 7.

The nozzle device 4 can be engaged by a mold assembly 32 in a well-known manner. The mold assembly 32 includes stationary and movable mold members 33 and 34 which define a mold cavity 35. An attachment 36 having a sprue 37 is mounted on the central opening 38 formed on the stationary mold member 33. The sprue 37 is aligned with the discharging aperture 8 on the nozzle body 7. Thus, entrance means is defined by the discharging aperture 8 and sprue 37 to connect between the nozzle device 4 and the mold cavity 35 of the mold assembly 32.

In operation, synthetic resin material is plasticized and pressurized within the injecting cylinder 1 by the screw 2 and fed from the cylinder 1 to the nozzle device 4. The pressure of material will be built up within the nozzle device 4 since the needle valve 20 is positioned by the compression spring 31 at a position shown in FIG. 1. When this pressure overcomes the force of the compression spring 31, the needle valve 20 is moved rearward against the compression spring 31 to open the discharging aperture 8 of the nozzle body 7. Therefore, the material is injected into the mold cavity 35 through entrance means, that is, the discharging aperture 8 and sprue 37. When the mold cavity 35 is filled with a predetermined amount of material to be molded, the screw 2 is stopped so that the needle valve 20 is seated on the valve seat 25 by the action of the compression spring 31 to close the discharging aperture 8 of the nozzle body 7. Thereafter, any pressurized fluid is fed to the mold cavity 35 through the fluid passage 26 of the needle valve 20 and the entrance means to form a hollow portion 40 within the body of material 41 which has been injected into the mold cavity 35. When the nozzle device 4 is separated from the attachment 36 on the mold assembly 32 by moving back the injecting cylinder 1 in any well-known manner, the pressurized fluid is released from the mold cavity 35 through the sprue 37.

FIG. 2 shows a source of pressurized gas which can be connected to the fluid passage of the needle valve shown in FIG. 1. This source includes a piston-cylinder mechanism 50 consisted of a cylinder 51 and a piston 52 slidably mounted within the cylinder 51 and having a piston rod 52A which serves as an indicator to show the piston position. The cylinder 51 is connected, at one side of the piston 52, to any suitable source of hydraulic fluid under pressure through any suitable changeover valve 54. At the other side of the piston 52, the cylinder 51 is connected to a vessel 55 containing any fluid such as gaseous nitrogen through a line 56 via a valve 57. The line 56 is connected, through a valve 58, to a line 59 which will be connected to the fluid passage 26 of the needle valve shown in FIG. 1. A pressure gauge 60 is located on the line 56.

As be apparent for a person skilled in the art, the gaseous fluid is fed from the vessel 55 to the cylinder 52 through the line 56 and the opened valve 57, and then pressurized within the cylinder 51 by supplying the hydraulic fluid from the source 53 to the cylinder 51 at the opposite side of the piston 52. When the pressure gauge 60 indicates a predetermined pressure, the valve 58 is opened to feed the pressurized fluid to the fluid passage 26 (see FIG. 1) through the line 59. At this time, the valve 57 has been closed. When it is desired to pressurize another body of fluid, the valve 58 is closed and the valve 57 is opened. The change-over valve 54 is then switched to discharge the hydraulic fluid from the cylinder 51. Consequently, the piston 52 is moved back by the pressure of the fluid from the vessel 55. Thereafter, the valve 57 is closed and the change-over valve 54 is again switched to supply the hydraulic fluid under pressure to the cylinder 51. The previous procedure will be repeated.

Figure 3:
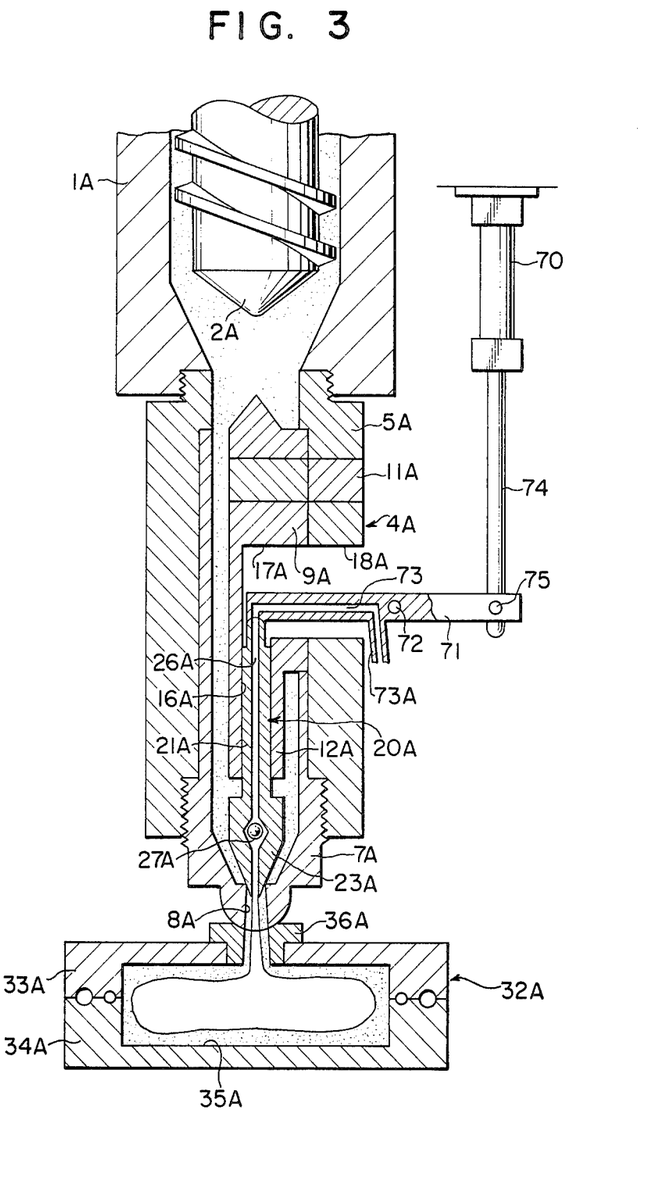
FIG. 3 is a longitudinally sectional view of an injection molding device which is another embodiment of the present invention.

Another embodiment shown in FIG. 3 is substantially identical with the embodiment shown in FIG. 1 except that the needle valve is actuated by a hydraulic cylinder 70. Therefore, the same parts is indicated by the same numeral with a suffix "A".

In FIG. 3, the needle valve 20A has its rearward end of a semi-spherical shape sealingly engaged by the corresponding semi-spherical shaped end portion of a lever 71 which is pivotally mounted on a pivot pin 72. The lever 71 has a passage 73 connected at the spherical joint to the fluid passage 26A of the needle valve 20A. The passage 73 can be connected at 73A to any suitable source of pressurized fluid.

The other end of the lever 71 is pivotally connected to the outer end of a piston rod 74 on the hydraulic cylinder 70 by means of a pin 75. Thus, the extension and contraction of the piston rod 74 causes the movement of the needle valve 20A to open and close the discharging aperture 8A of the nozzle body 7A, respectively.

Figure 4:
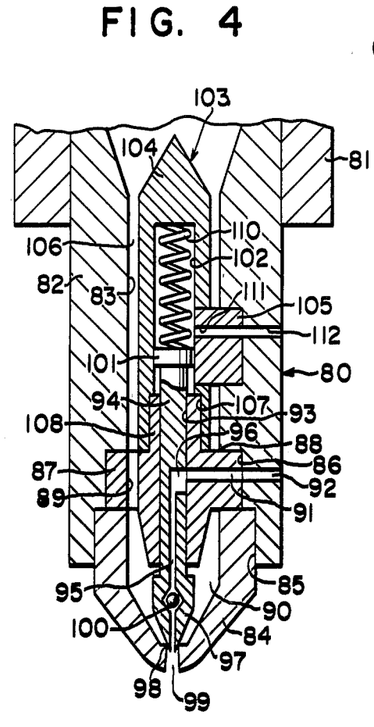
FIG. 4 is a sectional view showing a portion of the injecting cylinder which is provided with valve means of different structure from that of FIG. 1.

FIG. 4 shows still another embodiment of the present invention in which the needle valve and the actuator therefor are mounted in the interior of the nozzle device. In this embodiment, a nozzle device 80 is connected to a injecting cylinder 81 shown in part in a well-known manner. The nozzle device 80 includes a cylindrical base body 82 having a bore 83 formed therethrough and a nozzle body 84 fitted into the counter-bore 85 of the bore 83. The bore 83 has another counter-bore 86 formed therein which has a dimension larger than that of the bore 83 but less than that of the counter-bore 85. A supporting member 87 is mounted within the counter-bore 86 and secured firmly between the nozzle body 84 and the shoulder 88 of the bore 83. The supporting member 87 has a passageway 89 connecting the bore 83 with the hollow portion 90 of the nozzle body 84 and a transverse passageway 91 aligned with a transverse aperture 92 on the base body 82. The supporting member 87 has also a central aperture 93 formed therethrough within which a needle valve 94 is mounted slidably.

The needle valve 94 has a fluid passage 95 formed therein up to the middle way of the valve and a side opening 96 connected with the fluid passage 95. The side opening 96 is such positioned as to always align with the transverse passageway 91. The needle valve 94 has also a head 97 which can be engaged by a valve seat 98. This valve seat 98 is formed on the inner end of a discharging aperture 99 on the nozzle body 84 as described previously. The fluid passage 95 is opened at the apex of the head 97 so that it will communicate with the discharging aperture 99 even when the head is engaged by the valve seat 98 to close the discharging aperture 99. The fluid passage 95 includes a check valve 100 for the purpose as described previously.

The needle valve has at its rearward end a piston portion 101 which is mounted slidably within the blind bore 102 of an actuator 103. The actuator 103 includes a tubular body 104 secured firmly to the base portion 82 by means of a base 105 and having its outer periphery spaced from the inner periphery of the base body 82 to form a substantially annular passage 106. The blind bore 102 of the tubular body 104 has a counter-bore 107 receiving the rearward reduced end 108 of the supporting member 87 so that the tubular body 104 will be supported firmly by both of the base 105 and supporting member 87.

A compression spring 110 is located between the piston portion 101 of the needle valve 94 and the inner end of the blind bore 102 to urge the needle valve 94 toward the discharging aperture 99 of the nozzle body 84. The blind bore 102 is vented through transverse apertures 111 and 112 which are respectively formed on the respective base 105 and base body 82 to align with each other.

Similarly, the needle valve 94 is moved rearward against the action of the compression spring 110 by the pressure of material which has been built up within the hollow portion 90 of the nozzle body 84.

Figure 5:
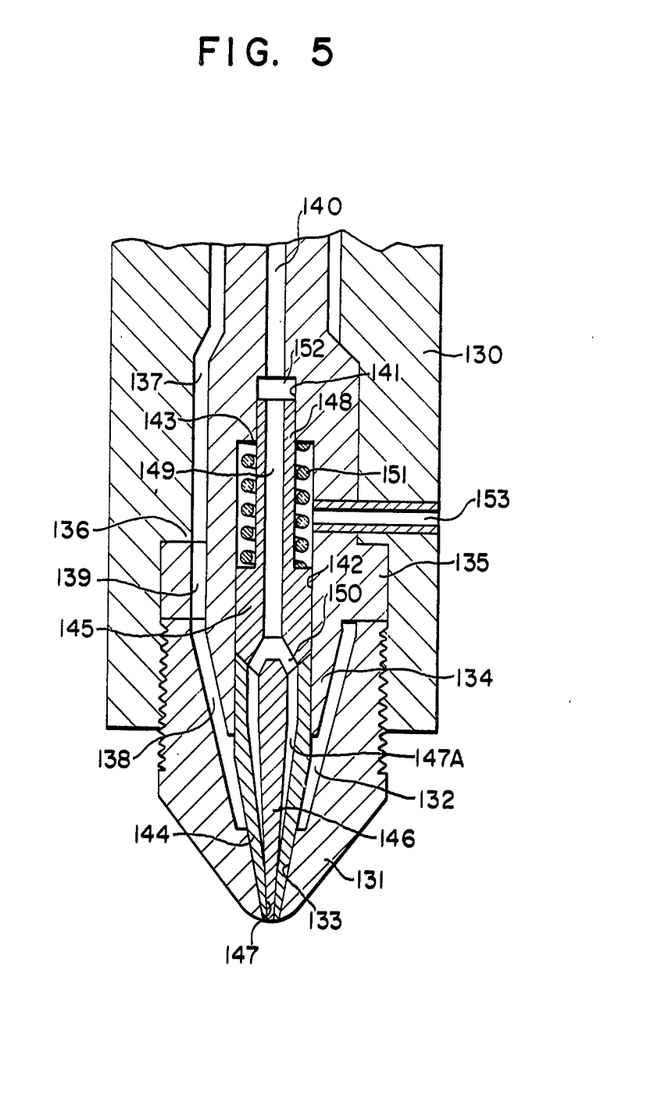
FIG. 5 is a view similar to FIG. 4, showing further different valve structure.

FIG. 5 shows a valve mechanism similar to that of FIG. 4 but having another valve located within the fluid passage for controlling the opening and closing thereof. In this embodiment, a base body 130 mounted on an injecting cylinder (not shown) has its forward end threaded by a nozzle body 131 which has a hollow portion 132 and a discharging aperture 133 communicating the hollow portion 132 with the outside thereof. The inner wall of the discharging aperture 133 serves as a valve seat as described hereinafter.

A supporting member 134 is located behind the nozzle body 131, which has a flange portion 135 sandwiched between the rearward face of the nozzle body 131 and the shoulder 136 of the base body 130. The outer periphery of the supporting member 135 is spaced from the inner walls of the base and nozzle bodies 130 and 131 to form substantially annular passages 137 and 138 which are connected to each other through a passage 139 formed in the supporting member 135.

The supporting member 135 includes a fluid passage 140 which can be connected to any suitable source of pressurized fluid (not shown) and has an enlarged intermediate portion 141 and a further enlarged valve-receiving portion 142 connected to the intermediate portion 141 to form a shoulder 143 therebetween.

A needle valve 144 has its substantially conical-shaped head received in the discharging aperture 133 to close it in co-operation with the inner wall thereof, that is, the valve seat. The rearward end of the needle valve 144 is slidably received in the valve-receiving passage portion 142 of the supporting member 134. The rearward end face of the needle valve 144 is engaged by another valve body 145 which is slidably mounted within the valve-receiving passage portion 142. The valve body 145 has its tapered tip portion 146 formed integrally therewith which protrudes into the hollow portion of the needle valve 144 for closing the opening 147 on the forward end thereof. There is a space 147A between the outer periphery of the tip portion 146 and the inner periphery of the needle valve 144 to communicate with the opening 147 as the tip portion 146 of the valve body 145 is moved rearward as described hereinafter.

The valve body 145 has also a reduced rearward end portion 148 received slidably in the intermediate passage portion 141 and a central passage 149 formed therein through the reduced portion 148 and valve body 145. The central passage 149 is connected to the space 147A between the needle valve 144 and the tip portion 146 of the valve 145 through inclined passageways 150 formed in the valve body 145.

The valve body 145 is resiliently urged to engage the needle valve 144 by means of a compression spring 151 located between the valve body 145 and the shoulder 143 around the reduced end portion 148 of the valve body 145. The rearward movement of the reduced end portion 148 is limited by means of the shoulder 152 between the fluid passage 140 and the intermediate passage portion 141. the space in which the spring 151 is housed is connected to the outside of the base body 130 through a transverse opening 153 formed in the supporting member 134 and base body 130.

In such an arrangement, when the pressure of material is built up around the needle valve within the hollow portion 132 of the nozzle body 131 and raised sufficiently to overcome the action of the compression spring 151, the needle valve 144 is moved rearward against the force of the spring 151 together with the valve body 145 to open the discharging aperture 133. As the pressure in the hollow portion 132 is lowered at the predetermined value, the needle valve 144 is moved back to its closed position together with the valve body 145 under the action of the spring 151. On the other hand, when the fluid passage 140 is supplied by the pressurized fluid from said source, the valve body 145 is only moved rearward against the action of the spring 151 due to the differential pressure between the tip portion 146 and inclined passages 150 and the rearward end face of the valve body 145 so that the space 147A will be connected to the opening 147 to discharge the pressurized fluid therethrough. At this time, the needle valve 144 is forced to the valve seat 133 by the pressure of the fluid passing through the space 147A. When the pressure in the fluid passage 140 is removed, the valve body 145 is engaged by the needle valve 144 under the action of the compression spring 151.

Figure 6:
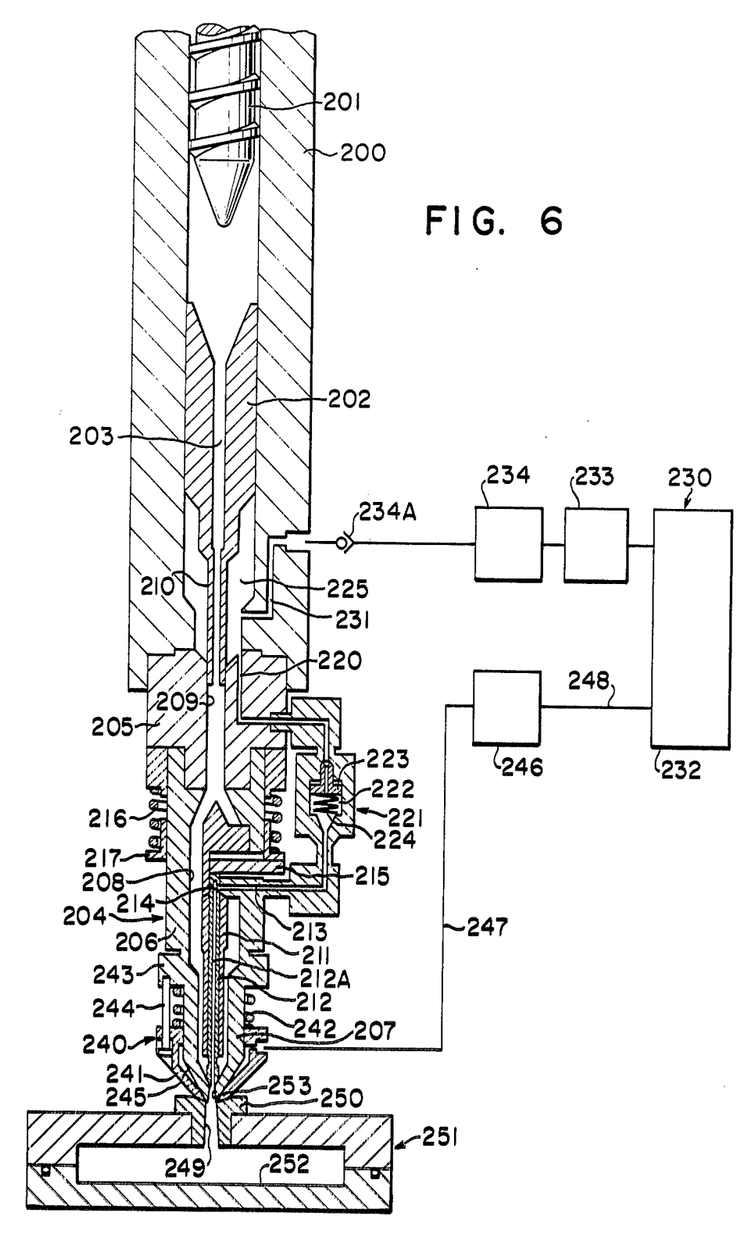
FIG. 6 is a longitudinally sectional view showing an injecting cylinder different from that of FIG. 2, which includes a different pressurizing mechanism and a fluid-releasing mechanism.

FIG. 6 shows an injection molding device adapted to withdraw the fluid for forming the hollow portion in a body of material within the mold cavity and to use a movable mandrel slidably mounted within the injecting cylinder.

In FIG. 6, an injecting cylinder 200 comprises a driving screw 201 for pressurizing synthetic resin material to be molded and a movable mandrel 202 mounted slidably within the injecting cylinder 200. The mandrel 202 can be moved forward by the raised pressure of material within the injecting cylinder 200. The mandrel 202 has a central passage 203 formed therethrough which serves to feed the pressurized material to a nozzle device 204.

The nozzle device 204 comprises a mounting member 205 connecting a base body 206 with the injecting cylinder 200. The base body 206 is connected integrally with a nozzle body 207. The inner peripheries of these bodies 206 and 207 define a substantially cylindrical passageway 208 connecting to the central passageway 209 formed in the mounting member 205. The forward reduced end 210 of the movable mandrel 202 is slidably fitted into the central passageway 209 of the mounting member 205 so that the material pressurized in the injection cylinder by means of the screw 201 will only be fed to the interior of the nozzle device 204.

Within the cylindrical passageway 208 of the nozzle device 204 there is mounted a supporting member 211 which is substantially identical with the structure of supporting member shown in FIG. 1. Therefore, a needle valve 212 is similarly supported slidably within the supporting member 211 except that the needle valve 212 has a fluid passage 212A formed therein which is always connected to a transverse passage 213 on the base body 206 through a side opening 214 formed in the needle valve 212. The needle valve has at its rearward end a transverse portion 215 extending outward through the side wall of the base body 206. This transverse portion 215 is urged forward by a compression spring 216 through a washer 217 in the same manner as described with respect to FIG. 1.

The mounting member 205 has a passage 220 formed therein which is connected to the transverse passage 213 through a valve 221. This valve 221 includes a valve chamber 222, a valve body 223 and a compression spring 224 urging the valve body 223 toward its close position. However, it is possible to use any suitable valve structure which serves to open as the pressure thereon exceeds a predetermined value.

The passage 220 of the mounting member 205 is opened at its opposite end to a forward chamber 225 defined by the forward face of the mandrel 202, the inner wall of the injecting cylinder 200 and the rearward end face of the mounting member 205. The forward chamber 225 is also connected to a liquid supply 230 through a passage 231 on the injecting cylinder 200.

The liquid supply 230 includes a liquid tank 232, a pump 233 for driving the liquid from the tank 232, and a heater 234 for heating the liquid fed from the tank 232 by the pump 233. There is a check valve 234A between the cylinder 200 and the heater 234 for avoiding the reverse flow of fluid from the cylinder 200. Therefore, the forward chamber 225 will receive the heated liquid such as water, paraffin or the like. The liquid is pressurized by the forward movement of the mandrel 202 and fed to the nozzle device 204 through the passage 220, the valve 221 and the transverse passage 213. Since there is the valve 221, the liquid is fed to the nozzle device 204 only after the liquid pressure reaches a predetermined value.

The nozzle device includes a withdrawing mechanism 240 consisting of a sliding cap 241 having a shape substantially conforming the forward end of the nozzle body 207 and a compression spring 242 located between the sliding cap 241 and the flange 243 on the nozzle body 207 to urge the slide forward. The sliding cap 241 is guided by a guide rod 244.

There is a space 245 between the forward end of the nozzle body 207 and the inner wall of the sliding cap 241. This space 245 is connected to a withdrawing pump 246 through a line 247, which pump is connected to the liquid tank 232 through a line 248. When the nozzle body 207 as well as the sliding cap 241 are engaged by a sprue 249 on an attachment 250 mounted on a mold assembly 251, the space 245 is shut off from the sprue 249. When the nozzle body 207 is separated away from the sprue 249, the sliding cap 241 remains as in that position due to the action of the spring 242 so that the space 245 will communicate with sprue 249.

In operation, the molten material within the injecting cylinder 200 is forced into the nozzle device through the central passage 203 of the mandrel 202 by means of the driving screw 201. At this time, the mandrel 202 is also moved forward but does not move sufficiently to actuate the valve 221 by compressing the liquid which has been fed to the forward cylinder chamber 225 from the liquid supply 230. Therefore, the material to be molded is first injected into the mold cavity 252 by moving rearward the needle valve 212 under that pressure which is raised within the nozzle device 204 until it exceeds the force of the compression spring 216. When the screw 201 is engaged by the rearward end of the mandrel 202, the injection of material is substantially completed so that the needle valve 212 is moved back to its closed position due to the action of the spring 216. Further movement of the screw 201 causes the mandrel to compress the liquid in the forward cylinder chamber 225 sufficiently to overcome the valve 221. Therefore, the liquid under pressure is fed into the mold cavity 252 through the transverse passage 213, the fluid passage 212A, the discharging aperture 253 and the sprue 249.

In order to withdraw the charged liquid from the mold cavity 252, the injecting cylinder 200, thus the nozzle body 207 can be moved rearward in any suitable manner to communicate the space 245 with the sprue 249, because the cap 241 is remained engaged by the attachment 250 under the action of the spring 242. Consequently, the pump 246 can withdraw the liquid from the mold cavity 252 through the space 245 and line 247 to return it to the liquid tank 232.

When the movable mandrel is used in an injecting cylinder having a piston ram rather than the screw 201 as in FIG. 6, the cylinder chamber between the ram and the rearward face of the mandrel can be used as a portion of the source of pressurized fluid. The rearward cylinder chamber would be connected to the liquid tank 232 through the pump 233 and to the fluid passage of the needle valve 212 through the valve 221. Moreover, any suitable extruder must be connected to the forward cylinder chamber before the movable mandrel 202. Therefore, such an arrangement may be more complicated and expensive than that of FIG. 6.

Figure 7:
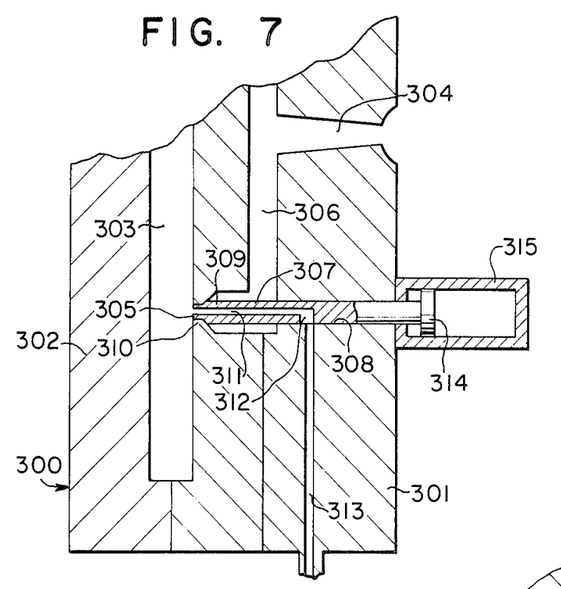
FIG. 7 is a fragmentary sectional view showing mold means provided with valve means mounted in the runner and actuated to open and close the gate.

FIG. 7 shows a mold assembly 300 provided with a valve mechanism according to the present invention. The mold assembly 300 includes stationary and movable mold members 301 and 302 which define a mold cavity 303 in a well-known manner. The stationary mold member 301 has a sprue 304 with its one end engaged by the nozzle portion (not shown) of the conventional injecting cylinder, at least two gates 305 (only one shown) opening to the mold cavity 303 and a runner 306 connecting the gates 305 with the sprue 304. The runner 306 is preferably heated by any suitable heating means as well known by a person skilled in the art. This is called as hot runner.

The runner 306 includes needle valves 307 each of which is disposed coaxially with the gate 305 and mounted slidably in an aperture 308 formed through the stationary mold member 301. The needle valve 307 has its tip portion 309 that can be engaged by a valve seat 310 formed on the side of the gate 305 remote from the mold cavity 303. The needle valve 307 has also a fluid passage 311 formed therethrough which is opened at its one end to the apex of the tip portion 309 and at the other end to the side opening 312 formed in the needle valve 307. This side opening 312 is such positioned that it always communicates with a passageway 313 formed in the stationary mold member 301. The passageway 313 is connected to any source of pressurized fluid.

The rearward end of the needle valve 307 has a piston 314 located slidably within a cylinder 315 which is firmly secured on the stationary mold member 301. The cylinder 315 is connected to any suitable source of hydraulic fluid (not shown) so that the piston 314 can be reciprocated within the cylinder 315 as desired.

When the material to be molded is injected into the mold cavity 303, the needle valve 307 is moved rearward by feeding the hydraulic fluid to the forward side of the piston 314 within the cylinder 315. Upon completing the injection of material, the needle valve 307 is moved forward by feeding the hydraulic fluid to the opposite side of the piston 314 to engage its tip portion 309 with the valve seat 310. Thus, each of the gates 305 is closed by the needle valve 307. However, fluid to be charged to the mold cavity can be supplied through the fluid passage 311 and passageway 313. Thus, the material to be molded can be prevented from mingling with the fluid in the runner 306.

Figure 8:
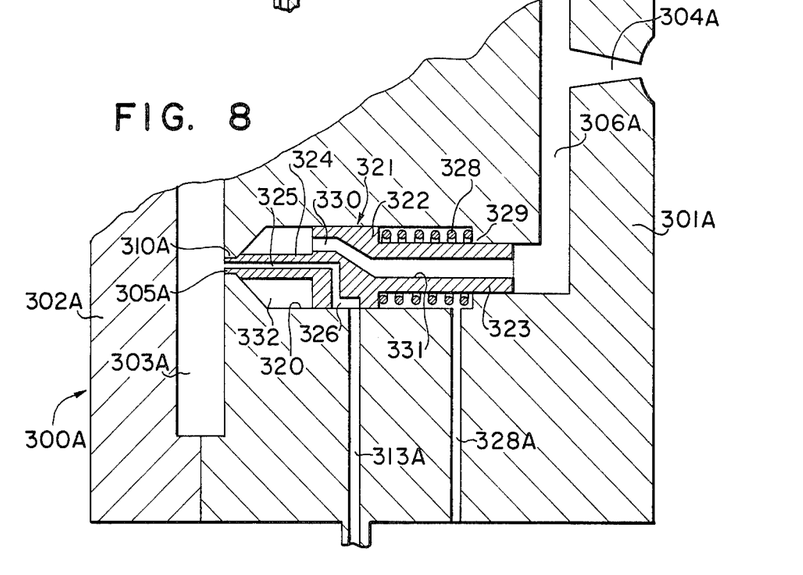
FIG. 8 is a view similar to FIG. 6, showing different valve means in the runner.

FIG. 8 shows another valve mechanism in which a compression spring is used as an actuator. A mold assembly is substantially identical with that of FIG. 6 so that the same parts are indicated by the same numeral with a suffix "A".

In FIG. 8, the runner 306A in the mold assembly 300A has an enlarged portion 320 receiving a valve body 321. The valve body 321 includes an enlarged body portion 322 mounted slidably within the enlarged runner portion 320, a rearward tubular portion 323 received slidably in the runner 306A and a forward needle portion 324 extending toward the gate 305A and aligned therewith. A fluid passage 325 is formed through the needle portion 324 and in a portion of the enlarged body portion 322. The fluid passage 325 has its one end opened at the apex of the needle portion 324. This opening is faced to the mold cavity 303A when the needle portion is engaged by the valve seat 310A to close the gate 305A. The other end of the fluid passage 325 is connected to a side opening 326 on the enlarged body portion 322. The side opening 326 is such positioned that it always communicates with the passageway 313A regardless of the position of the needle valve 321.

A compression spring 328 is located within the enlarged runner portion 320 between the rearward end face of the enlarged body portion 322 and the shoulder 329 of the runner 306A. Thus, the enlarged body portion 322 is urged forward to engage the tip of the needle portion 324 with the valve seat 310A.

The enlarged body portion 322 has also a passage 330 formed therethrough which connects the bore 331 of the tubular portion 323 with the space 332 defined between the forward face of the body portion 322 and the gate 305A.

When the material to be molded reaches the space 332 through the sprue 304A, the runner 306A, the bore 331 and the passage 330, the pressure of material causes the needle valve 321 to move rearward so that the gate 305A will be opened. When the pressure of material is lowered in the space 332, the needle valve 321 is moved forward by the action of the spring 328 so that the fluid can be fed under pressure to the mold cavity 303A through the fluid passage 325 and the passageway 313A.

Figure 9:
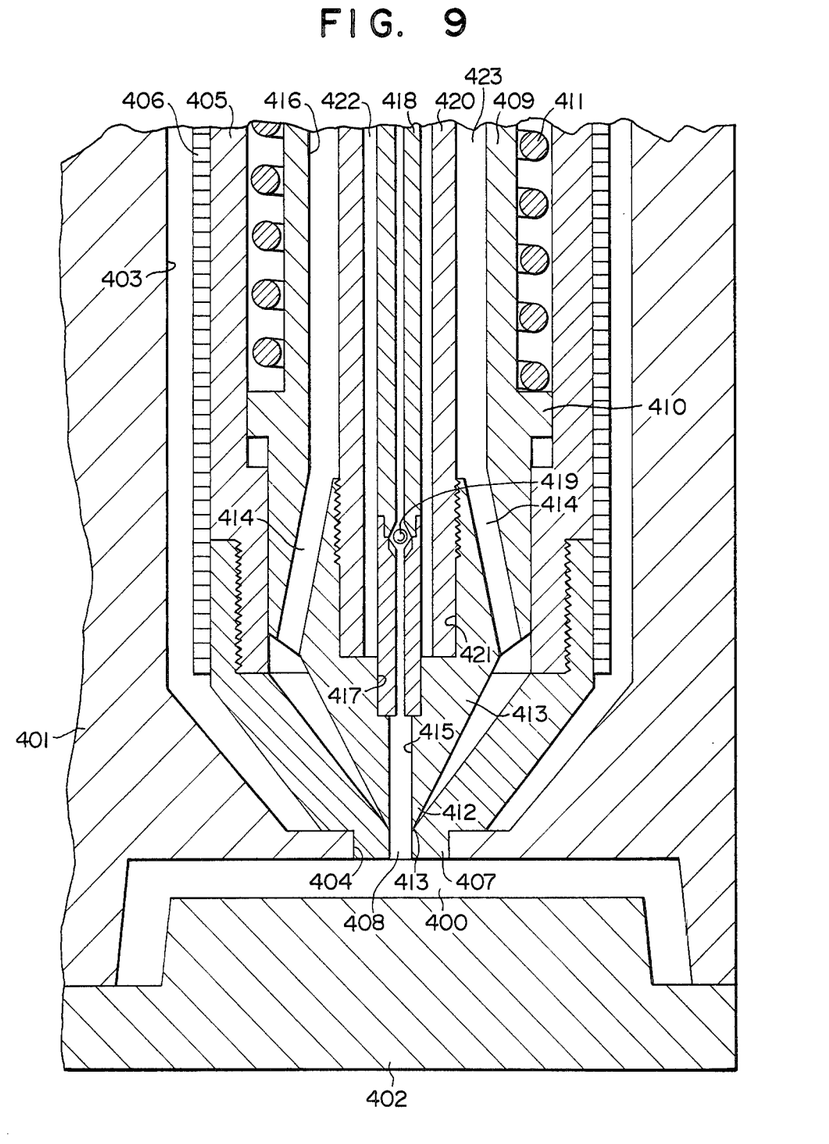
FIG. 9 is a view similar to FIGS. 6 and 7, showing further different valve means in the runner means.

In FIG. 9, a mold cavity 400 is defined by stationary and movable mold members 401 and 402. The stationary mold member 401 has a bore 403 formed with an opening 404 connecting to the mold cavity 400. Within the bore 403 there is located a sleeve-like runner block 405 the outer periphery of which is spaced from the inner wall of the bore 403 and has a heater 406 mounted thereon. The runner block 405 has its forward reduced end 407 formed therein which is received sealingly in the opening 404 of the stationary mold member 401 and has an axial aperture 408 used as a discharging aperture communicating with the mold cavity 400.

Within the runner block 405 there is slidably mounted a needle valve 409 having a flange 410 which is urged forward by means of a compression spring 411 to engage the conical tip portion 412 of the needle valve 409 with a valve seat 413. This valve seat 413 is formed on the end of the aperture 408 remote from the mold cavity 400.

The needle valve 409 has a forward end portion 413 having a plurality of side passages 414 and a central passage 415. The needle valve 409 has also a bore 416 connected to the side passages 414. The rearward end of the central passage 415 has an enlarged portion 417 receiving the forward end of a pipe 418 used as a fluid passage as previously described. The pipe 418 has a check valve 419.

A sleeve 420, which has its inner diameter larger than the outer diameter of the pipe 418, is received at its forward end in a recess 421 formed adjacent to the enlarged passage portion 417. The sleeve 420 defines a return passage 422 of annular shape together with the pipe 418. The outer periphery of the sleeve 420 is spaced from the inner periphery of the runner block 409 to form an annular passage 423 for material. The pipe 418 can be moved rearward away from the enlarged passage portion 417 by means of any suitable means (not shown) to release from the mold cavity 400 the fluid which has been charged in the mold cavity through the pipe 418 itself.

Figure 10:
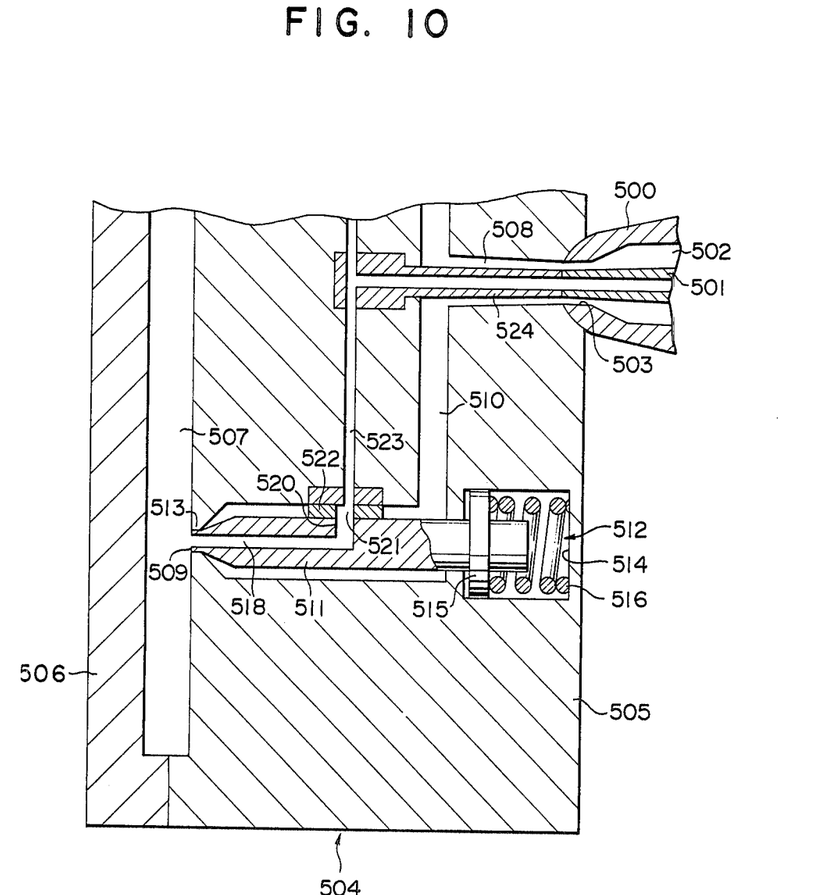
FIG. 10 is a view similar to FIGS. 6 and 8, showing valve means having different fluid-supplying means.

FIG. 10 shows an embodiment of the present invention different from the embodiments previously described. In this embodiment, an injecting cylinder is used in which the nozzle 500 has a pipe 501 disposed coaxially of the inner periphery thereof and spaced from this inner periphery to form substantially an annular passage 502. Therefore, the discharging aperture 503 will be of a double coaxial passage structure.

A mold assembly 504 includes stationary and movable mold members 505 and 506 which define a mold cavity 507. The stationary mold member 505 has a sprue 508 engaged by the nozzle 500, at least two gates 509 (only one shown) facing to the mold cavity 507, and a runner 510 connecting each gate 509 with the sprue 508.

Within the runner 510 there is slidably mounted a needle valve 511 which is urged forward by an actuator 512 with the apex thereof engaged by a valve seat 513. This valve seat 513 is formed in the side of the gate 509 remote from the mold cavity 507.

The actuator 512 includes a chamber 514 formed in the stationary mold 505, a piston 515 formed on the rearward end of the needle valve 511, and a compression spring 516 received within the chamber 514 to urge the needle valve 511 in a direction that the gate 509 is closed by the apex of the needle valve 511. This actuator operates in the same manner as previously described.

Similarly, the needle valve 511 includes a fluid passage 518 formed therethrough up to the middle point of the needle valve. The passage 518 has its one end opening at the apex of the needle valve. This opening is faced to the interior of the mold cavity 507 when the gate 509 is closed by the apex of the needle valve 511 as described previously. The fluid passage 518 is also connected at the other end thereof to a side opening 520 on the needle valve 511. The side opening 520 is aligned with a similar opening 521 formed in a supporting piece 522 which is secured to the needle valve 511. These openings 520 and 521 are positioned so that they always communicate with a passageway 523 formed in the stationary mold member 505.

A pipe 524 is disposed coaxially in the sprue 508 to form a double sleeve-like passage. This pipe 524 is connected to the passageway 523 in any suitable manner well known in the art.

The material to be molded is injected into the mold cavity 507 through the annular passage 502 of the nozzle, the outer passage of the sprue 508, the runner 510 and each gate 509 in the same manner as previously described. The fluid is fed to the mold cavity 507 through the pipe 501 of the nozzle 500, the pipe 524, the passageway 523, the openings 521 and 520 and the fluid passage 518.

Some examples carrying out the present invention will now be described.

Example 1

By using the injection molding device shown in FIGS. 1 and 2, a disk-like article was molded with its diameter of 180 mm and its thickness of 15 mm. Material used was polystyrene. The material was heated and plastified before it was injected into the mold cavity with its amount of 260 g. Thereafter, gaseous nitrogen was charged in the mold cavity under the pressure of 80 kg/cm². After cooled, the article was obtained with its hollow portion formed therein.

Example 2

By using the same injection molding device as in the example 1, foamable synthetic resin, polystyrene, containing n-pentane of 3% by weight as foaming agent and talc of 1% by weight as nucleating agent was heated and plastified under such back pressure sufficiently to prevent the foamable material from foaming. The material of 260 g was injected into the mold cavity after it was filled with the gaseous nitrogen having the pressure of 10 kg/cm² in any suitable manner as well known in the art. Thereafter, another gaseous nitrogen having the pressure of 80 kg/cm² was charged in the mold cavity through the needle valve to form a hollow portion in the body of material injected. Subsequently, the first charged nitrogen of 10 kg/cm² was released from the mold cavity and then the second charged nitrogen of 80 kg/cm² was released therefrom. Consequently, the foamable material was expanded inward to its own hollow portion to provide a foamed structure having its smooth surface without swirl mark.

Example 3

By using the injection molding device shown in FIGS. 2 and 3, the same material as in the example 2 was molded under the same conditions as in the example 2. A foamed article having its good surface without swirl mark was obtained.

Example 4

By using the injection molding device shown in FIG. 6, foamable synthetic resin, polystyrene, containing n-pentane of 3% by weight and talc of 1% by weight was injection molded into the same disk-like article as in the example 1. However, this article had its foamed core portion different from that of the example 1. Water was used as the pressurized fluid.

Referring to FIG. 6, the above material of 260 g was plastified under high temperature by the screw 201 behind the mandrel 202 and then accumulated therein. Water was fed to the forward chamber 225 from the tank 232 by means of the pump 233. The water was heated by means of the heater 234 during feeding. The forward movement of the screw 201 causes the material to force into the mold cavity 252 through the central passage 203 of the mandrel 202, the nozzle device 204 and the sprue 249. The mold cavity 252 was pre-pressurized with air of 10 kg/cm² in any suitable manner as well known in the art.

When the forward end of the screw 201 was engaged by the rearward end of the mandrel 202, the injection of material was completed. Further movement of the screw 201 causes the mandrel 202 to move forward with higher pressure so that the water in the forward chamber 225 is pressurized into sufficient pressure to overcome the valve 221. Consequently, the pressurized water was fed to the mold cavity 252 through the passage 220, the valve 221, the transverse passage 213, the fluid passage 212A of the needle valve 212, the discharging aperture 253 and the sprue 249. Thus, a semi-product having the skin layer of non-foamed foamable synthetic resin and the hollow portion filled with the pressurized water was present within the mold cavity. After any time interval, the injecting cylinder 200, thus the nozzle body 207 was moved rearward so that the space 245 was connected to the sprue 249 through the aperture on the apex of the slide 241. Consequently, the water could be withdrawn by the pump 246 through the space 245. This resulted in a foamed article having its smooth surface without swirl mark and its formed core portion enclosed by the non-foamed skin layer. The foamed article had a foaming ratio of 1.5.

Although the preferred embodiments of the present invention have been described with reference to the accompanying drawings, many modifications and changes may be effected by those skilled in the art without departing from the scope and spirit of the invention as appended hereinafter.

We claim:

1. A mold assembly suitable for use in an injection molding machine having a nozzle for injection, comprising a body, at least one mold cavity in said body for receiving a synthetic resin from said injection molding machine; a sprue in said body for establishing a direct connection to the nozzle of said machine; at least one gate opened to the interior of said mold cavity; runner means connecting said sprue with said gate and being heated by heating means; valve seat means formed in said gate at that portion of said gate which faces said runner means; valve means including a needle valve slidably mounted within said runner means and being movable into engagement with said valve seat means, said needle valve having a tip portion and a fluid passage formed through said needle valve which is opened at its one end in said tip portion of said needle valve which faces the interior of said mold cavity when said needle valve is engaged by said valve seat means, the other end of said fluid passage being connected to a connecting passage formed in said body, said connecting passage being in turn connected to a source of pressurized fluid; and actuator means in said mold assembly for engaging said needle valve with said valve seat means to close said gate.

2. The mold assembly as set forth in claim 1 wherein said fluid passage of said needle valve includes another valve means for controlling flow through said fluid passage.

3. The mold assembly as set forth in claim 1 wherein said actuator means includes spring means resiliently urging said needle valve toward said valve seat means, said needle valve being movable from said valve seat means against the influence of said spring means when the pressure of material built up around said needle valve overcomes the urging force of said spring means.

4. The mold assembly as set forth in claim 1 wherein said actuator means includes a piston-cylinder mechanism for bringing said needle valve into engagement with said valve seat means.

5. The mold assembly as set forth in claim 1 wherein said source of pressurized fluid includes a piston-cylinder mechanism for pressurizing fluid to be supplied to the fluid passage of said needle valve.

6. The mold assembly as set forth in claims 1 wherein the nozzle of said injection machine has a pipe disposed coaxially of the inner periphery thereof and spaced from said inner periphery to define coaxial passages; said mold body including a tube disposed coaxially of said sprue and spaced from the inner periphery thereof, said tube having one end connected to said connecting passage in said body, the other end of said tube being disposed to connect with said pipe of said nozzle when said sprue is engaged by said nozzle.

* * * * *